US012109154B2

(12) United States Patent
Davis et al.

(10) Patent No.: US 12,109,154 B2
(45) Date of Patent: Oct. 8, 2024

(54) COLLAPSIBLE CASKET WITH REDUCED SHIPPING AND/OR STORAGE FOOTPRINT AND SHIPMENT PACKAGE

(71) Applicant: Vandor Group, Inc., Richmond, IN (US)

(72) Inventors: Justin F. Davis, Richmond, IN (US); Gerald H. Davis, Fountain City, IN (US); William Perry English, Richmond, IN (US)

(73) Assignee: Vandor Group, Inc., Richmond, IN (US)

( * ) Notice: Subject to any disclaimer, the term of this patent is extended or adjusted under 35 U.S.C. 154(b) by 56 days.

(21) Appl. No.: 17/992,584

(22) Filed: Nov. 22, 2022

(65) Prior Publication Data

US 2024/0164972 A1 May 23, 2024

Related U.S. Application Data

(63) Continuation-in-part of application No. 17/004,885, filed on Aug. 27, 2020, now Pat. No. 11,504,291.

(60) Provisional application No. 62/893,655, filed on Aug. 29, 2019.

(51) Int. Cl.
*A61G 17/007* (2006.01)
*A61G 17/02* (2006.01)

(52) U.S. Cl.
CPC ....... *A61G 17/0073* (2013.01); *A61G 17/034* (2017.05)

(58) Field of Classification Search
CPC .............. A61G 17/0073; A61G 17/034; A61G 17/004; A61G 17/0407; A61G 19/00; A61G 21/00; B65D 5/001; B65D 5/3635; B65D 5/3642; B65D 5/4266; B65D 5/64; B65D 5/24; B65D 5/247; B65D 21/02; B31B 50/00
See application file for complete search history.

(56) References Cited

U.S. PATENT DOCUMENTS 4,702,409 A * 10/1987 Osborne ................ B65D 5/003 229/125
5,775,061 A * 7/1998 Enneking ............... B65D 85/00 53/445

(Continued)

FOREIGN PATENT DOCUMENTS

CA 3091603 A1 * 2/2021 ........... A61G 17/004

*Primary Examiner* — William L Miller
(74) *Attorney, Agent, or Firm* — Maginot, Moore & Beck LLP

(57) ABSTRACT

A shipment package includes container blanks and lid blanks. Each container blank has a first length and is foldable into a casket container. Each container blank has first and second folded over ends. The container blanks are stacked such that the first folded over ends of the plurality of container blanks are at least partially aligned, and such that the second folded over ends of the plurality of container blanks are at least partially aligned. Each lid blank is foldable into a casket lid having at least approximately the first length, and is configured to cover an interior of the casket container. Each lid blank is folded over a widthwise fold line such that the lid blank has a length less than the first length. A first lid blank is disposed between two container blanks, and between folded over ends of one of the container blanks.

12 Claims, 8 Drawing Sheets

(56) References Cited

U.S. PATENT DOCUMENTS

| | | | | |
|---|---|---|---|---|
| 5,915,680 A * | 6/1999 | Umemura | A61G 17/047 | 27/35 |
| 6,202,270 B1 * | 3/2001 | Bowman | A61G 17/0106 | 27/4 |
| 6,314,626 B1 * | 11/2001 | Becker | A61G 17/0106 | 217/65 |
| 6,317,944 B1 * | 11/2001 | Beaulieu | A61G 17/034 | 27/35 |
| 8,079,119 B1 * | 12/2011 | Ferko, III | A61G 17/0073 | 27/4 |
| 8,104,151 B2 * | 1/2012 | Cox | A61G 17/004 | 27/4 |
| 11,504,291 B2 * | 11/2022 | Davis | A61G 17/0073 | |
| 2005/0193535 A1 * | 9/2005 | Davis | B65D 85/62 | 27/2 |
| 2010/0263177 A1 * | 10/2010 | Abayhan | A61G 17/0106 | 27/7 |
| 2014/0352120 A1 * | 12/2014 | Hui | A61G 17/034 | 27/14 |
| 2018/0127151 A1 * | 5/2018 | Pantelleria | B65D 5/3642 | |
| 2020/0346817 A1 * | 11/2020 | Traub | B65D 5/0005 | |
| 2021/0059885 A1 * | 3/2021 | Davis | A61G 17/0073 | |
| 2021/0106485 A1 * | 4/2021 | Houde | A61G 17/0073 | |

* cited by examiner

COLLAPSIBLE CASKET WITH REDUCED SHIPPING AND/OR STORAGE FOOTPRINT AND SHIPMENT PACKAGE

This application is a continuation-in-part of U.S. patent application Ser. No. 17/004,885, filed Aug. 27, 2020, which in turn claims the benefit of U.S. Provisional Patent Application Ser. No. 62/893,655, filed Aug. 29, 2019, both of which are incorporated herein by reference.

FIELD OF THE INVENTION

The present invention relates generally to caskets, and more specifically, to caskets that are formed from a corrugated paper blank.

BACKGROUND

While many caskets are formed of hard materials such as wood, brass and other metal, other caskets are formed of corrugated paper and similar materials. Paper-based caskets have reduced manufacturing cost, reduced shipping costs, and are particularly suitable for cremation. Paper caskets generally have reduced shipping costs due to their reduce weight compared to metal, brass or hardwood. Moreover, paper caskets can have further reduced shipping costs if they can be shipped flat, in bundles.

One of the most basic paper casket designs is a Kraft cremation box. The Kraft cremation box is formed from a die-cut blank, which is folded into a box shape for use as a casket. Today, the blanks for typical plain Kraft cremation boxes measure approximately 42"×93", and the corresponding blanks for lids measure 30"×81". The dimensions of an assembled Kraft cremation box and lid (for use to contain and fit a deceased human adult body) is 73" long, 22" wide and 10" deep. These boxes are assembled with cable ties as commonly used to bundle multiple electrical wires in complex installations.

The Kraft cremation boxes are often shipped as blanks. In particular, cremation box blanks and lids are often placed on large wooden skids and delivered to distribution warehouses for resale in smaller quantities to crematories. The Kraft cremation boxes, with or without lids, are shipped to crematories (or other funerary establishments) as blanks, or in other words, lying down flat.

The problem with shipping these types of large flat products on common carrier vehicles is their size. As discussed above, the typical cremation box blank is about 42"×93". For tractor-trailers, which have a width of typically at least 99", the skids can be loaded either lengthwise or widthwise. However, the skids with the blanks can only be loaded into delivery trucks lengthwise, because smaller delivery trucks are often limited to approximately 89" in width. Regardless of how the skids are loaded, different delivery destinations (loading docks, etc.) have different geometries. Based on the geometry of the loading dock or other factors, it can be advantageous or even necessary to rotate and move the skid within the truck using a pallet jack. Because the 42"×93" cremation blanks have a hypotenuse of over 102", the skid cannot be rotated within either truck, but particularly not the delivery truck.

One solution to the size problem would be to ship the Kraft cremation boxes fully assembled. Because the assembled 73"×22" box has a hypotenuse well under 80", the fully assembled cremation boxes can easily be rotated and manipulated with delivery truck for ease of unloading. The drawback to shipping assembled cremation boxes is that fewer boxes can be stacked vertically, since they are at least 10" high (with lids), as opposed to blanks that are on the order of 1" high.

U.S. Pat. No. 8,104,151 teaches another cremation container that has a reduced height and is otherwise partially assembled for shipment such that it has a narrow hypotenuse. While this design addresses the issues of shipment discussed above, the design nevertheless has some interior space for transport of casket interior products, which increases the volume occupied by each cremation box.

There is a need for a paper casket design and shipment method for simple cremation boxes that have reduced height (where few or no interior components need not be shipped with the box), and which can be readily rotated within standard and smaller sized delivery trucks.

SUMMARY

At least some of the embodiments described herein provide a low cost and easy to ship paper casket that includes gusseted corners, and a shipment mode or configuration (folded blank) in which two of the gussets are partially constructed. In some embodiments an angled cutout is provided at the intersection of the gusseted corners and the long side panels so that in the shipment mode, the hypotenuse of the folded blank is reduced even further.

A first embodiment is a folded blank that includes a bottom panel side panels, and end panels. The bottom panel has opposite side edges and opposite end edges defining a length and width sized to support a deceased human body in the supine position. The side panels are connected to the opposite side edges of the bottom panel, and extend outward from and substantially parallel to the bottom panel. The end panels are foldably connected to the opposite end edges of the bottom panel, and are folded to extend inward from the corresponding opposite end edges. The folded blank also includes at least one gusset foldably connected to a side panel along a first fold line and connected to an end panel along a second fold line. The gusset has a diagonal fold, and has a first surface disposed adjacent to and coupled to the side panel in an additional location away from the first fold line.

A second embodiment is a method that includes providing a blank having a bottom panel having opposite side edges and opposite end edges defining a length and width sized to support a deceased human body in the supine position, side panels and end panels. The side panels are foldably connected to the opposite side edges of the bottom panel, and extend outward from and substantially parallel to the bottom panel. The end panels are foldably connected to the opposite end edges of the bottom panel, and extend outward from and substantially parallel to the bottom panel. The blank also includes at least a first gusset disposed foldably connected to a side panel along a first fold line and connected to an end panel along a second fold line. The first gusset has a diagonal fold. The method includes folding the end panel and the first gusset such that a first surface of the end panel abuts the bottom panel, and a first surface of the first gusset abuts a first surface of the side panel. The method further includes disposing the blank on a shipping support, and loading the shipping support with the blank onto a bed of a vehicle or trailer.

A third embodiment is shipment package that includes container blanks and lid blanks. Each container blank has a first length and is foldable into a casket container. Each container blank has first and second folded over ends. The container blanks are stacked such that the first folded over ends of the plurality of container blanks are at least partially aligned, and such that the second folded over ends of the plurality of container blanks are at least partially aligned. Each lid blank is foldable into a casket lid having at least approximately the first length, and is configured to cover an interior of the casket container. Each lid blank is folded over a widthwise fold line such that the lid blank has a length less than the first length. A first lid blank is disposed between two container blanks, and between folded over ends of one of the container blanks.

The above-described features and advantages, as well as others will become more readily apparent to those of ordinary skill in the art by reference to the following detailed description and accompanying drawings.

DETAILED DESCRIPTION

Figure 1:
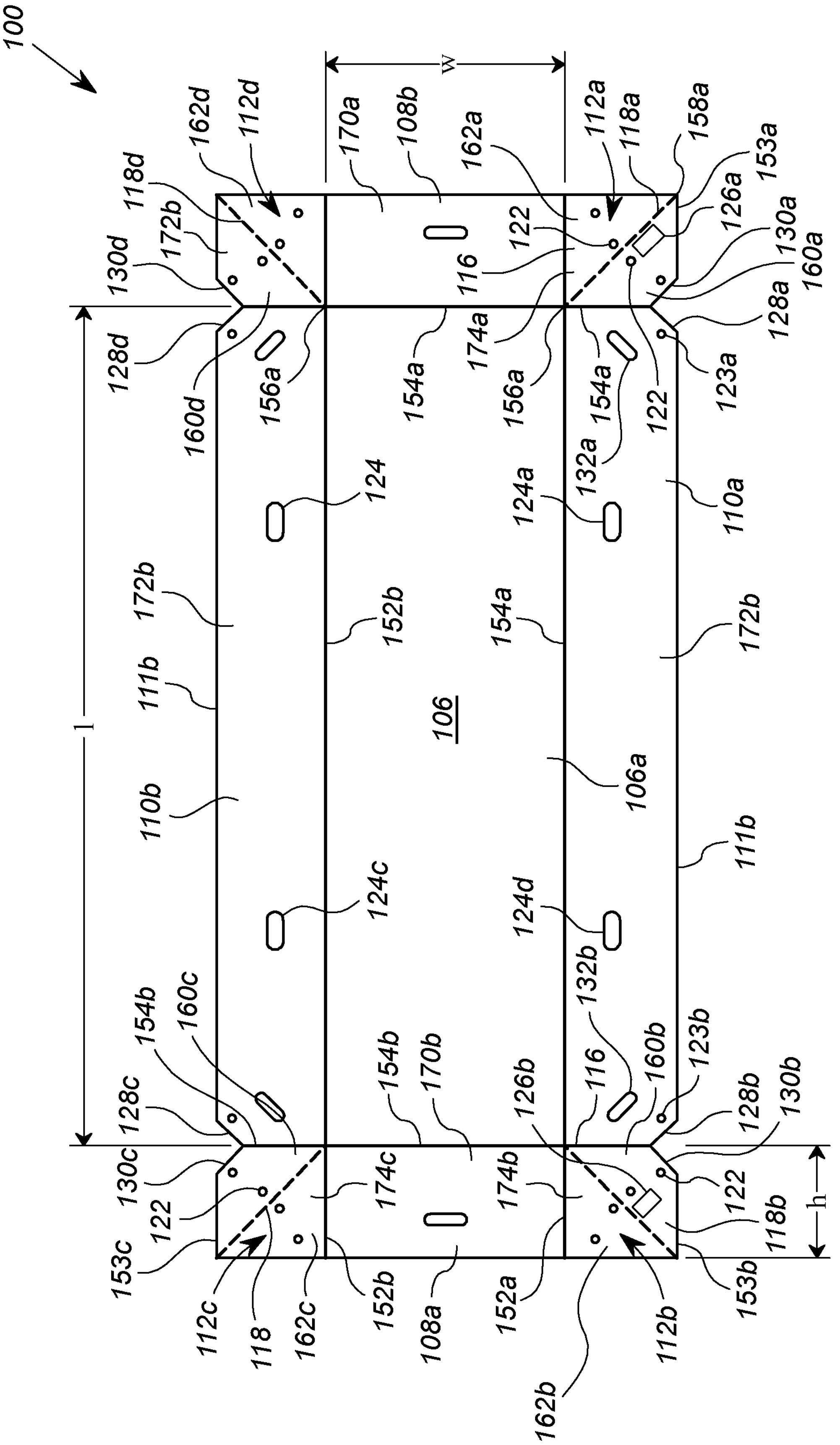
FIG. 1 shows a top plan view of an exemplary embodiment of an unfolded blank for a casket container according to at least some aspects of the invention.
Figure 2:
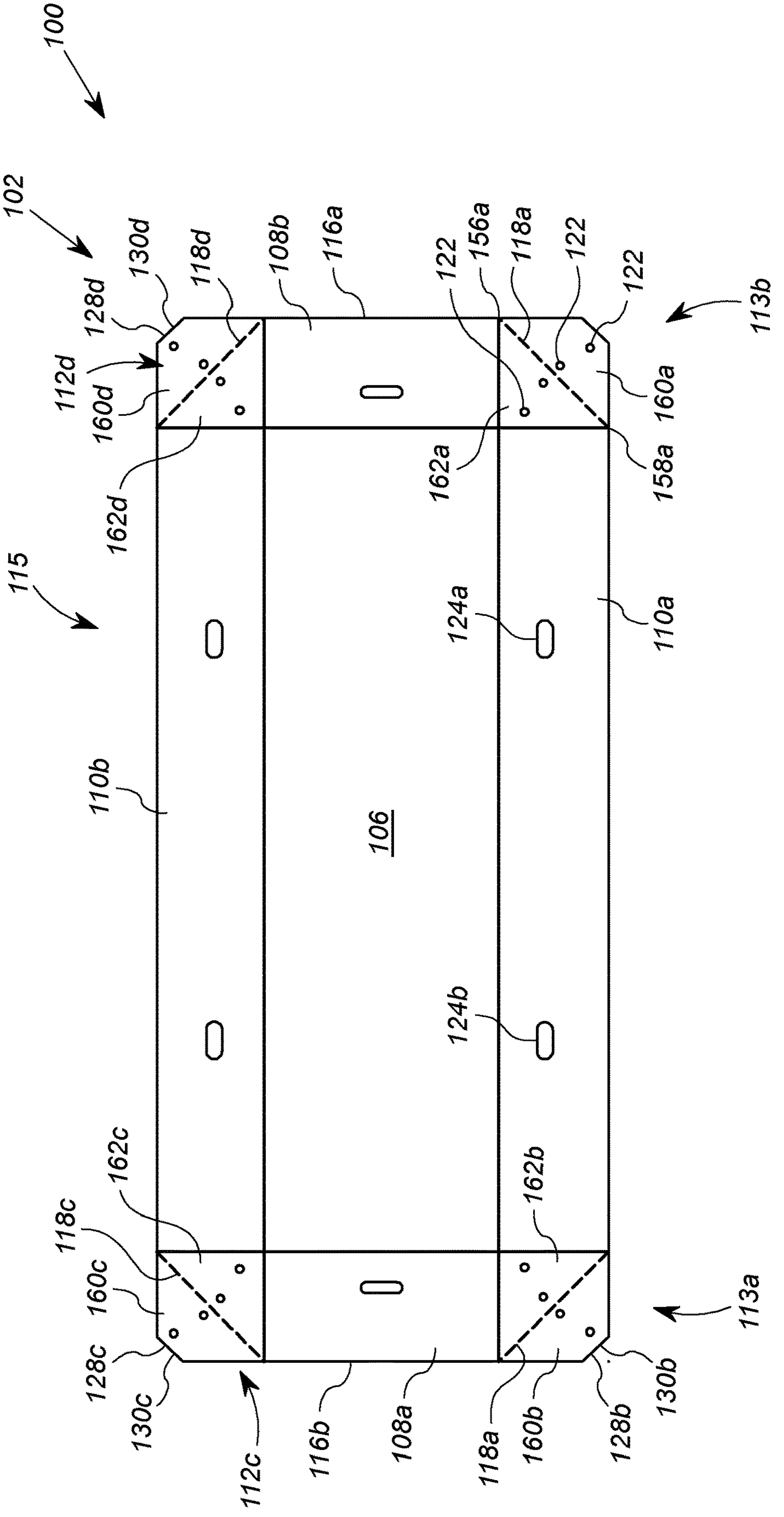
FIG. 2 shows a top plan view of a folded blank formed from the blank of FIG. 1, configured for shipment.
Figure 5:
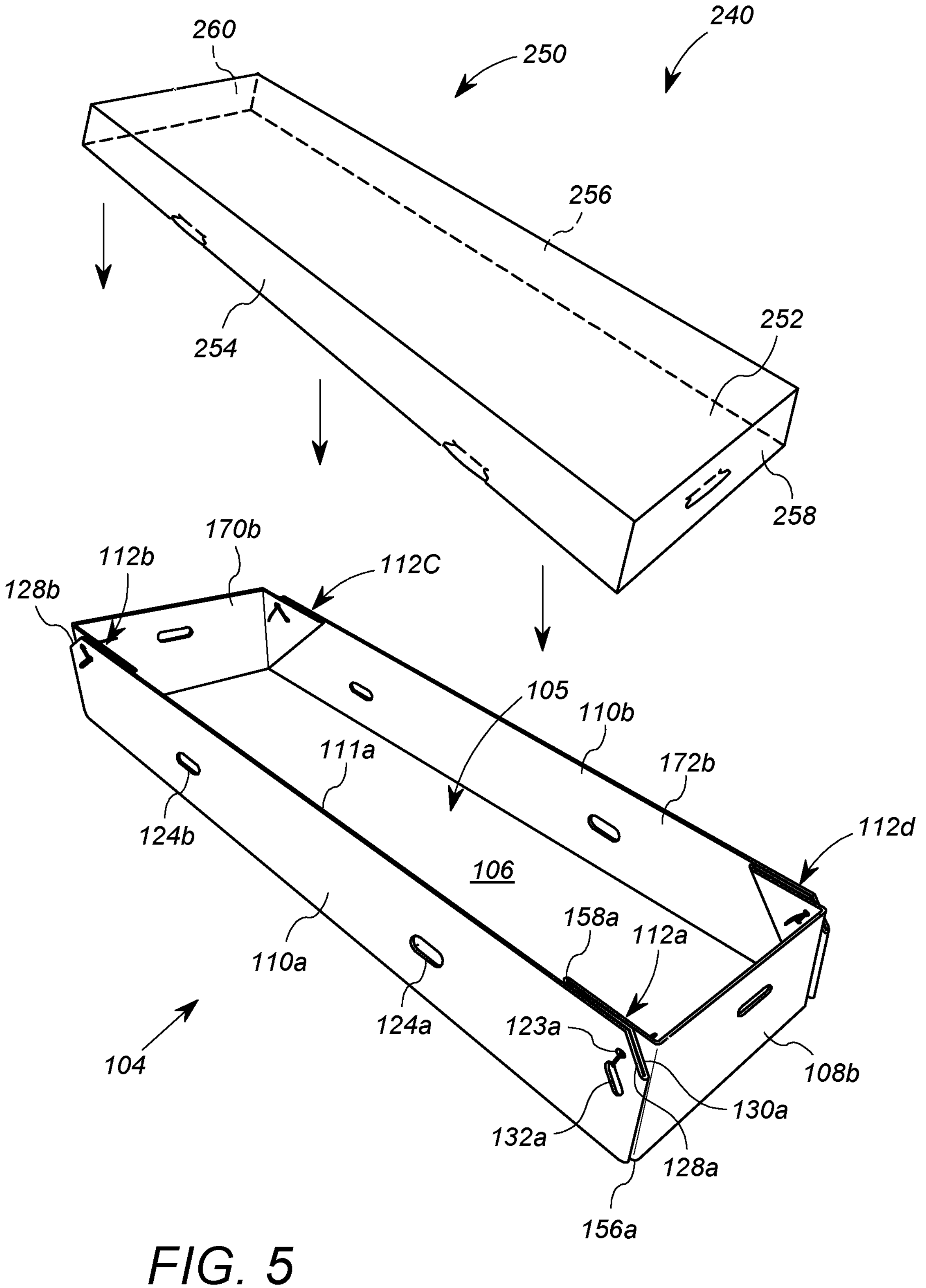
FIG. 5 shows a casket container assembled from the folded blank of FIG. 2; and a lid for use thereon.

FIG. 1 shows a top plan view an exemplary embodiment of a blank 100 that may be assembled into a casket container. The blank 100 may suitably be made of corrugated paper. FIG. 2 shows a top plan view of a folded blank 102 formed from the blank 100 of FIG. 1. The folded blank 102 is configured in a mode for shipment and storage, and has a reduced hypotenuse compared to the blank 100. As will be discussed below, FIG. 5 shows a fully assembled casket container 104 made from the blank 100.

Referring to FIG. 1, the blank 100 is preferably made of a single piece of corrugated paper or corrugate cardboard. The blank 100 includes a bottom panel 106, which is foldably connected to end panels 108*a*, 108*b* along fold lines 152*a*, 152*b*, and is further foldably connected to side panels 110*a*, 110*b* via fold lines 154*a*, 154*b*. The blank 100 further included unfolded gussets 112*a*-112*d*, which form the corner connections between the side panels 110*a*, 110*b* and the respective end panels 108*a*, 108*b*.

The bottom panel 106 is generally rectangular in this embodiment, and defines the length and width of the interior of the container 100. The bottom panel has an upper surface 106*a* visible in FIG. 1, and an opposite bottom surface, not shown. In this embodiment, the bottom panel 106 has a length l of 77.625" (between fold lines 154*a* and 154*b*), and a width w of 22.75" (between fold lines 152*a* and 152*b*), which is larger than the standard Kraft cremation box.

The end panel 108*a* extends the width w of bottom panel 106 on the fold line 154*a*, and extends away from the bottom panel by a distance h of 10.187". The distance h will define the height of the interior of the container 100 when constructed for use (e.g. casket container 104 of FIG. 5). The end panel 108*a* includes a first surface 170*a* that is parallel to the upper surface 106*a* of the bottom panel 106 in the blank 100. The end panel 108*b* similarly extends the width w of bottom panel 106 on the fold line 154*a*, and extends away from the bottom panel by the distance h of 10.187". The side panel 110*b* also includes a first surface 172*b* parallel to the upper surface 106*a* in the unfolded blank 100. It will be appreciated that the values of h, l, and/or w can vary and still provide a casket container that incorporates elements of the embodiment described herein.

The side panel 110*a* extends the length l of bottom panel 106 on the fold line 152*a*, and extends away from the bottom panel 106 by the distance h to an outer edge 111*a*. The side panel 110*b* similarly extends the length l of bottom panel 106 on the fold line 152*b*, and extends away from the bottom panel 106 by a distance h to an outer edge 111*b*. The side panel 110*a* includes a first surface 172*a* that is parallel to the upper surface 106*a* of the bottom panel 106 in the blank 100. The side panel 110*a* has a chamfered corner 128*a* that extends at an angle from the fold line 154*a* to the outer edge 111*a*, and a chamfered corner 128*b* that extends at an angle from the fold line 154*b* to the outer edge 111*a*. Similarly, the side panel 110*b* has a chamfered corner 128*c* that extends at an angle from the fold line 154*b* to the outer edge 111*b*, and a chamfered corner 128*d* that extends from the fold line 154*a* to the outer edge 111*b*. The chamfers 128*a*-128*d* may suitable extend between 2 and 5 inches.

The side panel 110*a* further includes two cable through-holes 123*a*, 123*b*, two angled handle through-holes 132*a*, 132*b*, and two main handle through-holes 124*a*, 124*b*. The cable through-hole 123*a* is adjacent to the chamfered corner 128*a*, and is sized to fit a cable tie or similar element, not shown in FIG. 1. The angled handle through-hole 132*a* is disposed proximate the cable through-hole 123*a* and approximately midway between the fold line 152*a* and the outer edge 111*a* and is sized to receive at least three fingers of a typical adult human hand. The cable through-hole 123*b* is adjacent to the chamfered corner 128*b*, and is sized to fit a cable tie or similar element, not shown in FIG. 1. The angled handle through-hole 132*b* is disposed proximate the cable through-hole 123*b* and approximately midway between the fold line 152*a* and the outer edge 111*a* and is sized to receive at least three fingers of a typical adult human hand. The main handle through-holes 124*a*-124*b* are similarly sized or slightly larger than the handle through-holes 132*a*, 132*b*. The main hand through-holes 124*a*, 124*b* are spaced apart and are intermediate of the angled handle through-holes 132*a*, 132*b*.

The side panel 110*b* further includes two cable through-holes 123*c*, 123*d*, two angled handle through-holes 132*c*, 132*d*, and two main handle through-holes 124*c*, 124*d*, that are correspondingly disposed as their respective counterparts of the side panel 110*a*.

The gusset 112*a* is disposed at the corner between the end panel 108*b* and the side panel 110*a*. The gusset 112*a* is foldably connected to the end panel 108*b* along the fold line 152*a*, and is foldably connected to the side panel 110*a* along fold line 154*a*. The gusset 112*a* includes a first surface 174*a* that is parallel to the upper surface 106*a* of the bottom panel 106 in the blank 100. In this embodiment, the gusset 112*a* extends from the fold line 152*a* to a side edge 153*a* by the same distance that the side panel 110*a* extends from the fold line 152*a*. The gusset 112*a* extends from the fold line 154*a* by the same distance by which the end panel 108*b* extends from the fold line 154*a*.

The intersection of the fold lines 152*a* and 154*a* forms an interior corner 156*a* of the gusset 112*a*. A gusset fold line 118*a* extends from this corner 156*a* to the diametrically opposite corner 158*a* of the gusset 112*a*. The fold line 118*a* divides the gusset 112*a* into a side panel portion 160*a* adjacent the side panel 110*a* and an end panel portion 162*a* adjacent the end panel 108*b*. The side panel portion 160*a* includes a chamfered corner 130*a* extending parallel to the fold line 118*a* for 2-5 inches from the fold line 154*a* to the side edge 153*a*. The chamfered corner 130*a* is disposed adjacent to and is preferably a mirror image of the chamfered corner 128*a*, such that the chamfers 128*a*, 130*a* collectively form a symmetrical V-shaped cutout between the edges 153*a*, 111*a*. The gusset 112*a* further includes plurality of holes 122 disposed symmetrically about the gusset fold line 118*a*.

The gusset 112*b* is disposed at the corner between the end panel 108*a* and the side panel 110*a*. The gusset 112*b* is foldably connected to the end panel 108*a* along the fold line 152*a*, and is foldably connected to the side panel 110*a* along fold line 154*b*. The gusset 112*b* includes a first surface 174*b* that is parallel to the upper surface 106*a* of the bottom panel 106 in the blank 100. Similar to the gusset 112*a*, the gusset 112*b* extends from the fold line 152*a* to a side edge 153*b* by the same distance that the side panel 110*a* extends from the fold line 152*a*. The gusset 112*b* extends from the fold line 154*b* by the same distance by which the end panel 108*a* extends from the fold line 154*b*.

A gusset fold line 118*b* extends from the intersection of the fold lines 152*a* and 154*b* to the diametrically opposite corner of the gusset 112*b*. The fold line 118*b* divides the gusset 112*b* into a side panel portion 160*b* adjacent the side panel 110*a* and an end panel portion 162*b* adjacent the end panel 108*a*. The side panel portion 160*b* includes a chamfered corner 130*b* extending parallel to the fold line 118*b* for 2-5 inches from the fold line 154*b* to the side edge 153*b*. The chamfered corner 130*b* is disposed adjacent to and is preferably a mirror image of the chamfered corner 128*b*, such that the chamfers 128*b*, 130*b* collectively form a symmetrical V-shaped cutout between the edges 153*b*, 111*a*. The gusset 112*b* further includes plurality of holes 122 disposed symmetrically about the gusset fold line 118*b*.

The gusset 112*c* is disposed at the corner between the end panel 108*a* and the side panel 110*b*. The gusset 112*c* is foldably connected to the end panel 108*a* along the fold line 152*b*, and is foldably connected to the side panel 110*b* along fold line 154*b*. The gusset 112*c* includes a first surface 174*c* that is parallel to the upper surface 106*a* of the bottom panel 106 in the blank 100. The gusset 112*c* extends from the fold line 152*b* to a side edge 153*c* by the same distance that the side panel 110*b* extends from the fold line 152*a*. The gusset 112*b* extends from the fold line 154*b* by the same distance by which the end panel 108*a* extends from the fold line 154*b*. A gusset fold line 118*c* extends from the intersection of the fold lines 152*b* and 154*b* to the diametrically opposite corner of the gusset 112*c*. The fold line 118*c* divides the gusset 112*c* into a side panel portion 160*c* adjacent the side panel 110*b* and an end panel portion 162*c* adjacent the end panel 108*a*. The side panel portion 160*c* includes a chamfered corner 130*c* having a length of 2-5 inches, extending parallel to the fold line 118*c* from the fold line 154*b* to the side edge 153*c*. The chamfered corner 130*c* is disposed adjacent to and is preferably a mirror image of the chamfered corner 128*c*, such that the chamfers 128*c*, 130*c* collectively form a symmetrical V between the edges 153*c*, 111*b*. The gusset 112*c* further includes plurality of holes 122 disposed symmetrically about the gusset fold line 118*c*.

The gusset 112*d* is disposed at the corner between the end panel 108*b* and the side panel 110*b*. The gusset 112*d* is foldably connected to the end panel 108*b* along the fold line 152*b*, and is foldably connected to the side panel 110*b* along fold line 154*a*. The gusset 112*d* includes a first surface 174*d* that is parallel to the upper surface 106*a* of the bottom panel 106 in the blank 100. Similar to the gusset 112*c*, the gusset 112*d* extends from the fold line 152*b* to a side edge 153*c* by the same distance that the side panel 110*b* extends from the fold line 152*b*. The gusset 112*d* extends from the fold line 154*a* by the same distance by which the end panel 108*b* extends from the fold line 154*a*. A gusset fold line 118*d* extends from the intersection of the fold lines 152*b* and 154*a* to the diametrically opposite corner of the gusset 112*d*. The fold line 118*d* divides the gusset 112*d* into a side panel portion 160*d* adjacent the side panel 110*b* and an end panel portion 162*d* adjacent the end panel 108*b*. The side panel portion 160*d* includes a chamfered corner 130*d* extending 2-5 inches parallel to the fold line 118*d* from the fold line 154*a* to the side edge 153*d*. The chamfered corner 130*d* is disposed adjacent to and is preferably a mirror image of the chamfered corner 128*d*, such that the chamfers 128*d*, 130*d* collectively form a symmetrical V-shaped cutout between the edges 153*d*, 111*b*. The gusset 112*d* further includes plurality of holes 122 disposed symmetrically about the gusset fold line 118*d*.

In this embodiment, the blank 100 includes a connector 126*a* (in this case, double-sided tape) on the gusset part 160*a*, and another connector 126*b* on the gusset part 160*b*.

As shown in FIG. 1, the largest dimensions of the blank are a length of 98" and a width of 43.125". In this embodiment, the blank 100 is folded into a casket that will have dimensions that are larger than standard prior art Kraft containers to conform to evolving body sizes. As discussed above, the assembled casket in this embodiment will have a length l of 77.625" (as opposed to 73") and a width w of 22.75" (as opposed to 22"). However, the same design may be used with a blank configured for the standard casket dimensions.

To ship the blank 100 to an end user, the blank 100 is first converted to a shipment configuration or shipment configuration. FIG. 2 shows a top plan view the blank 100 in shipment configuration, which is referred to herein as the folded blank 102.

To convert the blank 100 in the shipment blank 102, one folds the first end panel 108*a* and the gussets 112*b* and 112*c* as a group along the fold line 154*b*. The end panel 108*a* and gussets 112*b* and 112*c* are folded such that a first surface 170*a* of the end panel 108*a* abuts the top surface 106*a* of the bottom panel 106, and the corresponding surfaces 174*b* and 174*c* of the gussets 112*b*, 112*c* abut, respectively, the surfaces 172*a*, 172*b* of the side panels 110*a*, 110*b*. The end panel 108*b* and gussets 112*a* and 112*d* are similarly folded over along fold line 154*a*. Thus, as shown in FIG. 2, the folded blank 102 is essentially the blank 100 with both end panels 108*a*, 108*b* and their corresponding gussets 112*a*-112*d* folded 180° inward along fold lines 154*a*, 154*b* of FIG. 1.

The connector 126*a*, which as discussed above may be double-sided tape, is used to secure the gusset part 160*a* of the gusset 112*a* to the side panel 110*a* and the other connector 126*b* is used is used to secure the gusset part 160*b* of the gusset 112*b* to the side panel 110*a*. It will be appreciated that connectors other than two sided tape may be used, including ties, staples, adhesives etc. To allow proper subsequent folding of the gussets 112*a*, 112*b*, the respective portions 162*a*, 162*b* are not secured to the side panels 110*a*. In addition, for reasons that will be discussed below, the gussets 112*c*, 112*d* need not be secured to the side panel 110*b*. However, in other embodiments, the gussets 112*c*, 112*d* may be secured to the side panel 110*b* in the same way that the gussets 112*a*, 112*b* are secured to the side panel 110*a*

As shown in FIG. 2, in the folded blank 102, the cutouts 130*a*-130*d* align vertically with the respective cutouts 128*a*-128*d* such that they form chamfered corners of the folded blank 102. These corners reduce the hypotenuse of the folded blank 102 to increase the rotatability of the blanks 102 in small spaces, such as within a delivery truck. More significantly, because the end panels 108*a*, 108*b* have been folded over, the length of the folded blank 102 has been reduced from the length of the original blank 100 to approximately the length of the bottom panel 106 (i.e. the length of the constructed casket). Such reduction also greatly improves maneuverability (rotation) of the blank 102. The reduction in the hypotenuse from the chamfered corners 128*a*-128*d* and 130*a*-130*d* combined with the reduced length allows a folded blank for the standard size (or even larger) casket body to be shipped and rotated within standard commercial shipping vehicles.

Figure 3:
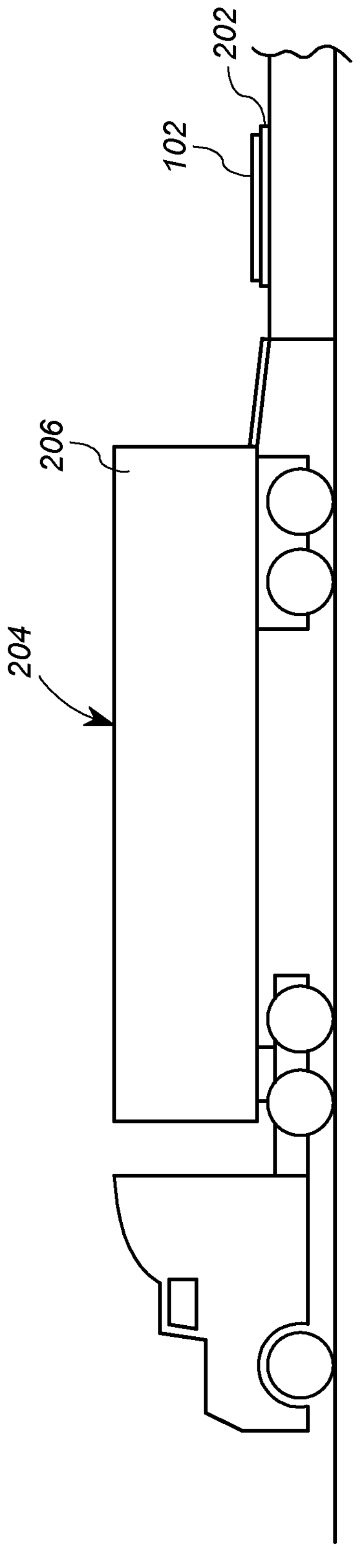
FIG. 3 show a side representative view of the folded blank of FIG. 2 loaded for shipment in context with a transport vehicle.

As shown in FIG. 3, the folded blank 102 may then be loaded onto a pallet 202, or other shipping support for conveyance in a vehicle 204, and in this case, a vehicle trailer 206. Several folded blanks having the design and configuration of the folded blank 102 may be stacked (with chamfered corners aligned) and shipped on the same support 202. The support or pallet 202 may be loaded into the trailer 206 of the vehicle 204 in any horizontal orientation. Once the vehicle 204 arrives at the destination the pallet 202 may be moved out of the trailer 206 by a pallet jack, not shown. It may be necessary, depending on the geometry of the loading dock at the destination, which varies from destination to destination, to rotate the pallet 202 (e.g. 90 degrees) within the vehicle 204 to facilitate unloading. The reduced dimensions of the folded blanks 102 allow such rotation.

Figure 4:
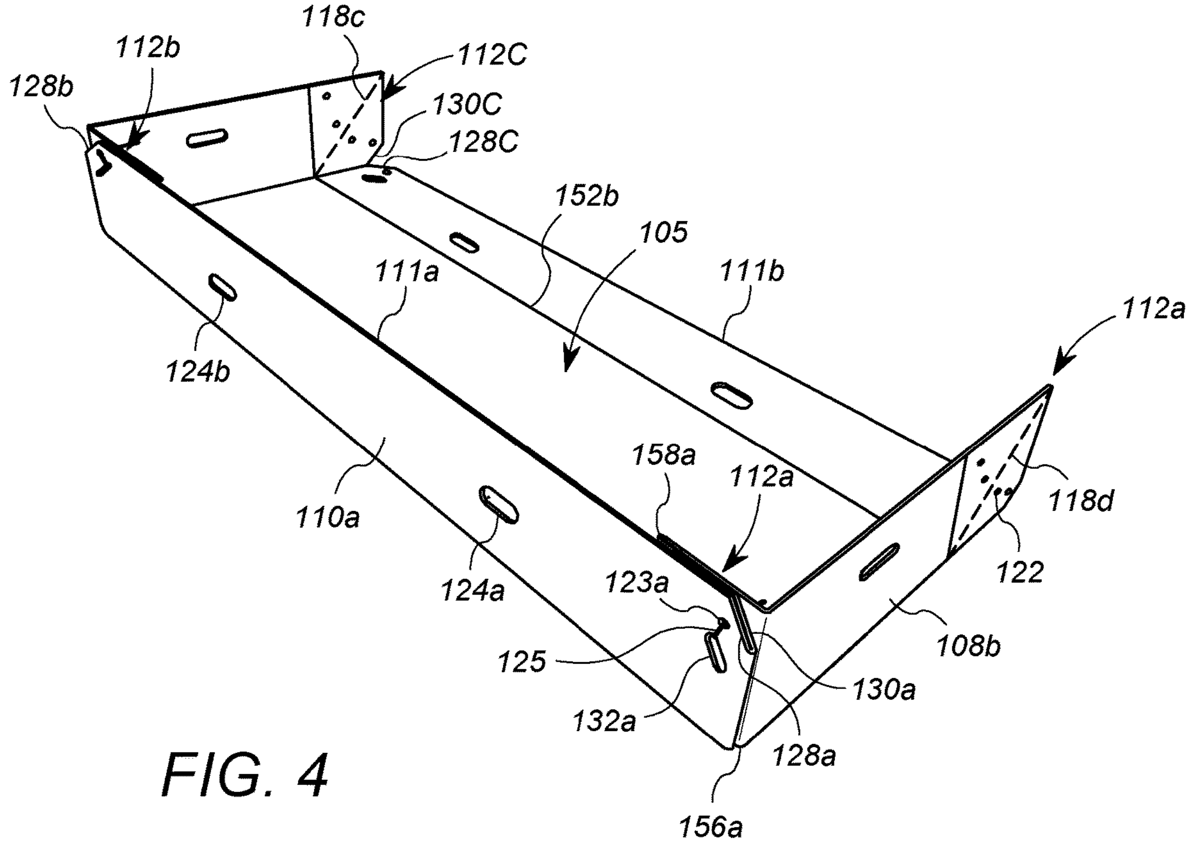
FIG. 4 shows a perspective view of the folded blank of FIG. 2 partially assembled into a casket container and in a condition for inserting a deceased onto the bottom panel.

At the destination, the end user can store the folded blank 102 until use. For use, the folded blank 102 must be assembled into a casket body 104. Assembly of the folded blank 102 into a casket body is now discussed in connection with FIGS. 4 and 5. FIG. 4 shows a perspective view of the folded blank 102 partially assembled into a casket container and in a condition for inserting a deceased onto the bottom panel 106. FIG. 5 shows an assembled casket container 104 and a corresponding lid 250, which together form a casket assembly 240.

Referring to FIG. 4, once the folded blank 102 is ready for use, the side panel 110*a* and the end panels 108*a*, 108*b* are folded upward 90 degrees. Because the gusset part 160*a* of the gusset 112*a* is secured to the side panel 110*a* and the gusset part 160*b* of the gusset 112*b* is secured to the side panel 110*a*, the other respective gusset parts 162*a*, 162*b* of the gussets 112*a*, 112*b* fold over along respective fold lines 118*a*, 118*b* to abut the respective parts 160*a*, 160*b* as the end panels 108*a*, 108*b* and side panel 110*a* are folded upward. In this folded position, it is noted that the symmetrically disposed through holes 122 (on parts 160*a*, 162*a*) of the gusset 112*a* are aligned.

In addition, the through-holes 122 of the gusset 112*a* align with the through-hole 123*a* of the side panel 110*a* and a portion of the angled handle through-hole 132*a*. A cable tie 125 or similar flexible means can be inserted through the aligned through-holes 122 and 123*a*, and around through the other through-hole 122 and the handle through-hole 132*a* to secure the gusset 112*a* in place on the side panel 110*a*. In the secured position, the portion of the surface 174*a* of the gusset part 160*b* abuts the surface 172*a* of the side panel 110*a*, and the part of the surface 174*a* of the gusset part 162*a* faces away from the side panel 110*a*. The gusset 112*b* is secured in a similar manner.

Because the surfaces 174*c*, 174*d* of respective gussets 112*c*, 112*d* were not coupled to the side panel 110*b*, the gussets 112*c*, 112*d* stand vertically parallel to the end panels 108*a*, 108*b* and are not yet folded along lines 118*c*, 118*d* (except perhaps to small degree from pre-folding). In this configuration shown in FIG. 4, the casket body 104 has an open side in which a deceased may be inserted into the casket interior 105. Once the deceased is fully inserted onto the bottom panel 106, the side panel 110*b* can be folded upright, causing gussets 112*c*, 112*d* to fold along lines 118*c*, 118*d*. The gussets 112*c*, 112*d* can then be secured to the side panel 110*b* in the same manner used to secure the gussets 112*a*, 112*b* to the side panel 110*a*, discussed above. After the gussets 112*a*, 112*b* are secured to the side panel 110*a* and the gussets 112*c*, 112*d* are secured to the side panel 110*b* as discussed above, the casket body 104 is fully formed, as shown in FIG. 5.

As discussed above, cable ties 125 are used to secure the gussets 112*a*, 112*b*, 112*c* and 112*d* in the folded position shown in FIG. 5. Referring to FIG. 1, it is noted that in this embodiment, the small diagonal handles 132*a*-132*d* on the ends of the side panels 110*a*, 110*b* are used both as a through-hole for a cable tie, and to facilitate manipulation of the blanks 100, 102.

Referring to FIG. 5, the container 104 is paired with an appropriate lid 250 to form a casket assembly 240. The lid 250 in this embodiment is formed of corrugated paper and includes a top panel 252, a first side panel 254, a second side panel 256 shown in phantom, a first end panel 258, and a second end panel shown in phantom. The lid 250 is generally configured to cover the casket interior 105, and has a length and width the is at least approximately the length and width of the bottom panel 106. In many cases, the lid 250 fits over the casket container 104, or in other words, over the container panels 110*a*, 110*b*, 108*b* and 108*a*. However, the lid 250 may also suitably fit within or atop the container panels 110*a*, 110*b*, 108*b* and 108*a*. In all cases the lid 250 has a length and width at least approximately the width and length of the bottom panel 106.

Referring again to FIG. 2, it can readily be appreciated that the folded over end panels 108*a*, 108*b* and folded over gussets 112*a*, 112*b*, 112*c* and 112*d* form respective folded over ends 113*a*, 113*b* of the blank 100 that are thicker than the middle portion 115 of the blank 100 between the folded over ends 113*a*, 113*b*. As a result, when multiple folded blanks 100 (as shown in FIG. 2) are stacked, for example, on the pallet 202, there is a tendency for the middle portions 115 of the stacked blanks to sag, possibly damaging or compromising the integrity of one or more of the stacked blanks 100.

Accordingly, according to one embodiment of the invention, a corrugated paper lid blank is folded, for example, in half, and placed between adjacent stacked blanks 100 aligned with the middle portions 115 to form a spacer to compensate for the fact that the stacked folded over ends 113*a*, 113*b* are thicker than the middle portions 115.

Figure 6:
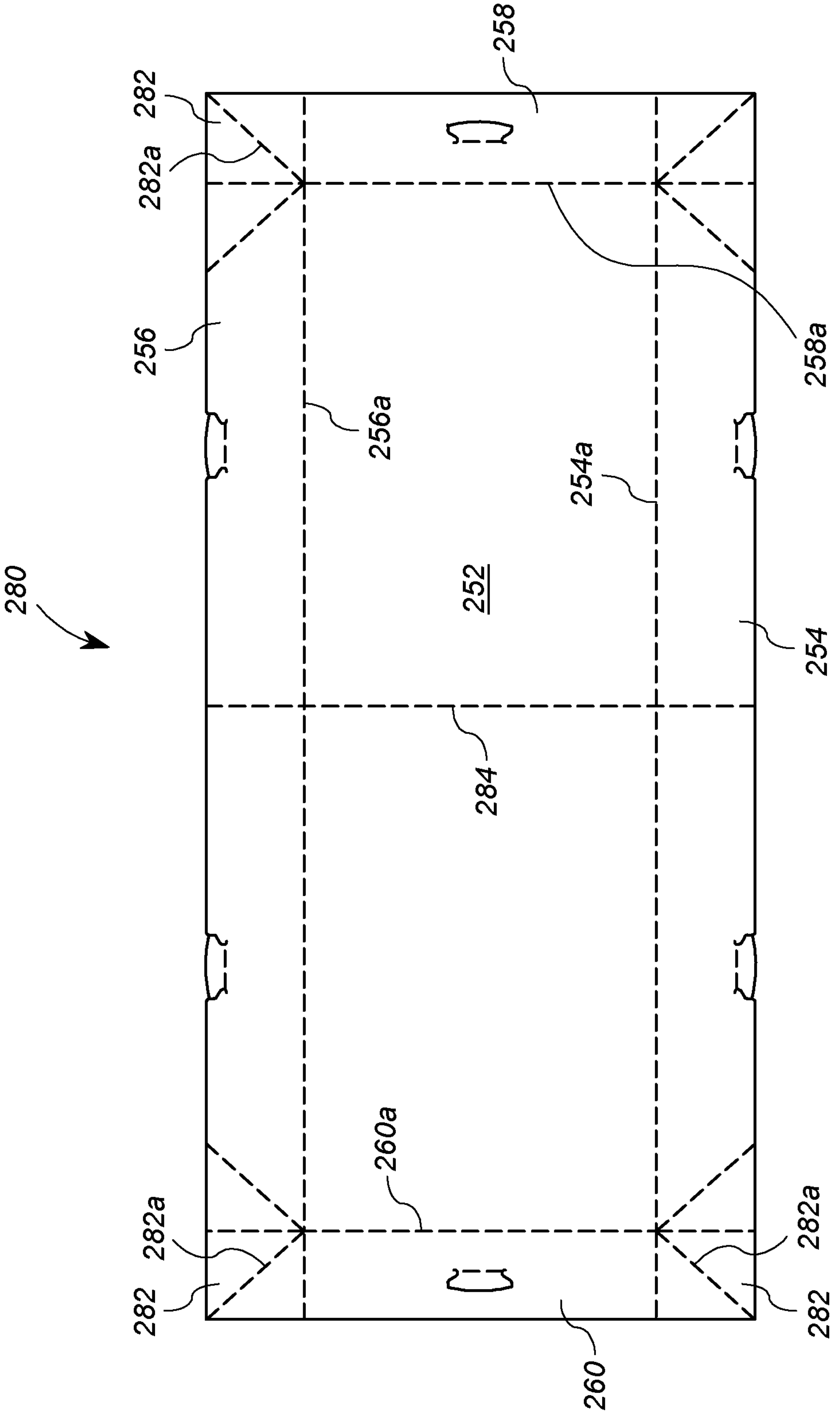
FIG. 6 shows a top plan view of an exemplary corrugated paper lid blank that is configured to be folded into the lid of FIG. 5.

FIG. 6 shows a top plan view of an exemplary corrugated paper lid blank 280 that is configured to be folded into the lid 250 of FIG. 5. As shown in FIG. 6, the end panels 258 and 260 are coupled to the top panel 252 via respective fold lines 258*a*, 260*a*, and the side panels 254, 256 are coupled to the top panel 252 via respective fold lines 254*a*, 256*a*. The side panels 254, 256 and end panels 258, 260 are coupled at their respective ends by corner gussets 282. The corner gussets 282 have diagonal fold lines 282*a* that allows for the gusset folding. The lid blank 280 also includes a widthwise fold line 284 that extends through a central area of the top panel 282, the side first panel 284 and the second side panel 286. The fold line 284 in this embodiment substantially bisects the top panel 282 (and side panels 284, 286), but in other embodiments may be off-center to some degree.

It will be appreciated that the fold lines in the blank 270 (and blank 100) are formed by creasing and/or scoring as is known in the art to facilitate folding along the corresponding fold line.

Figure 7:
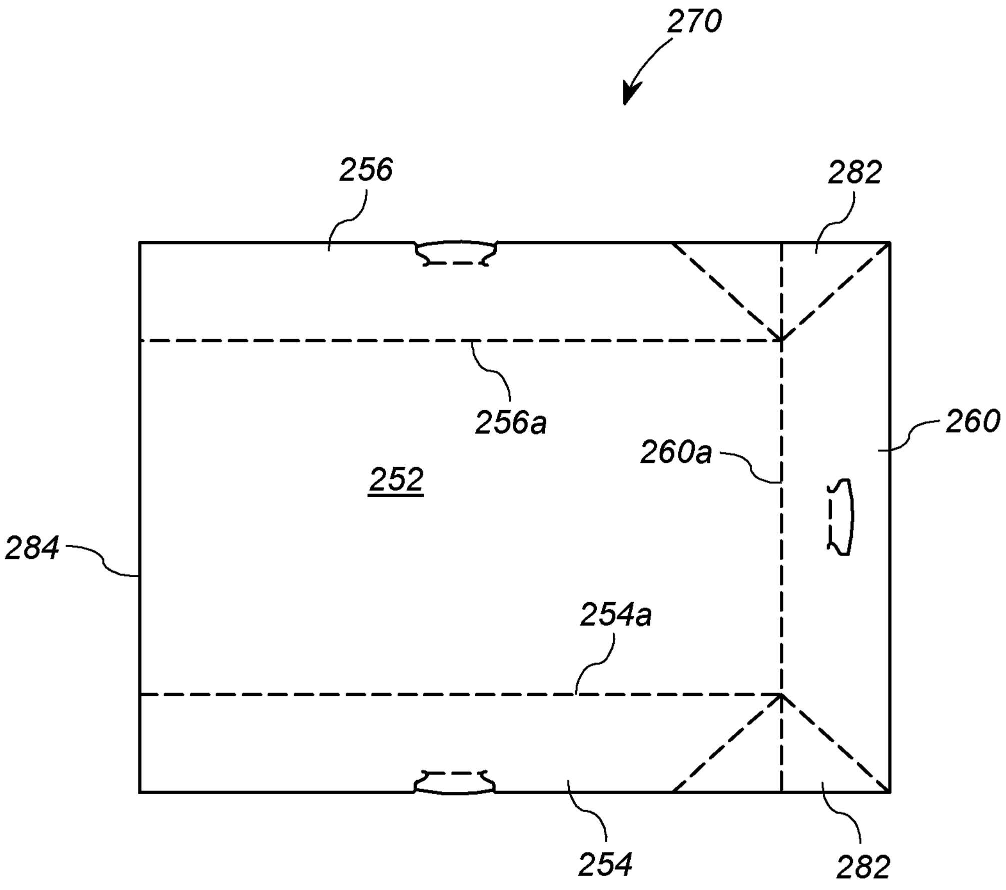
FIG. 7 shows a top plan view of the corrugated paper blank of FIG. 6 folded into the folded over blank.

For shipment, the corrugated paper lid blank 280 is folded along the fold line 284 to produce a folded over bank 270, as shown in FIG. 7. FIG. 7 shows a top plan view of the corrugated paper blank 280 folded into the folded over lid blank 270. The folded over lid blank 270 has a length that is reduced such that the length is less than the length of the middle portion 115 of the folded blank 100 of FIG. 2. In this embodiment, the length of the folded over lid blank 270 is approximately half of the length of the top panel 252 (and bottom panel 106 of the container blank 100).

Figure 8:
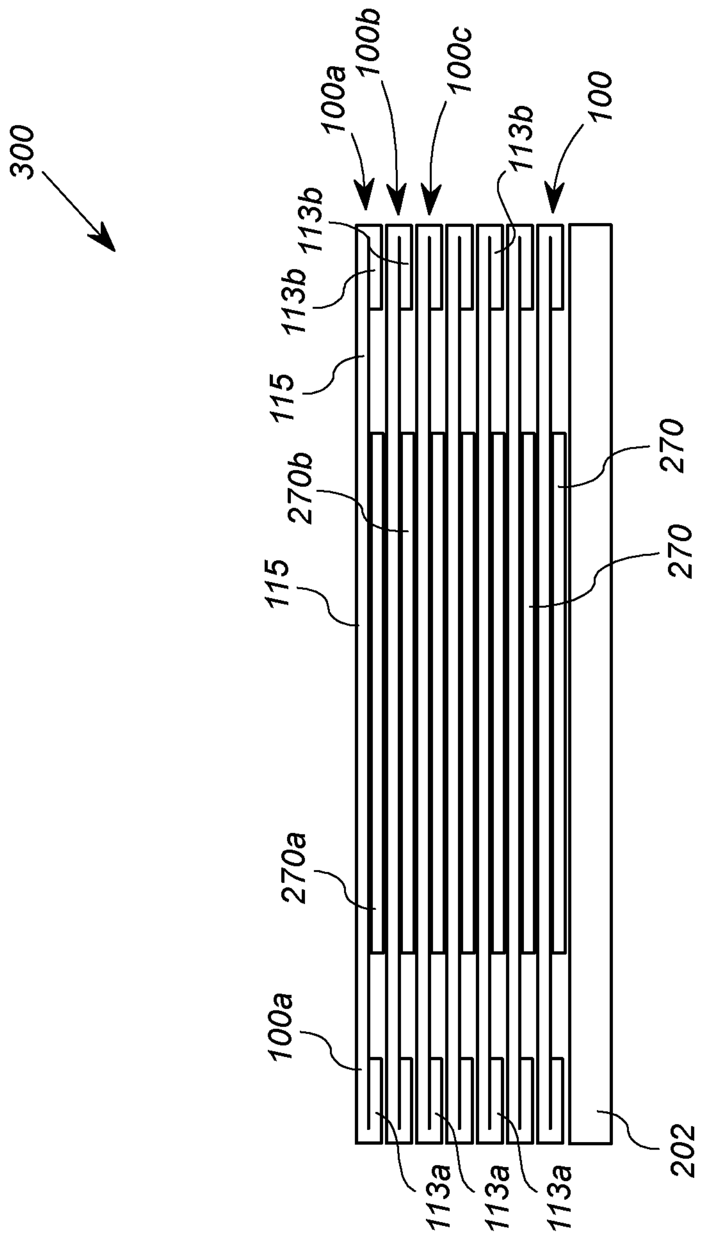
FIG. 8 shows a side plan view of a shipment package according to an embodiment.

FIG. 8 shows a schematic drawing a shipment package 300 having a plurality of folded casket container blanks 100*a*, 100*b*, 100*c*, etc. and a plurality of folded over casket lid blanks 270*a*, 270*b*, etc. stacked on a pallet 202. Each of the casket container blanks 100*a*, 100*b* in this embodiment has the structure of the container blank 100 discussed above, and is folded as illustrated in FIG. 2. Each of the casket lid blanks 270*a*, 270*b* has the structure of the folded over lid blank 270 of FIG. 7.

As shown in FIG. 8, the plurality of container blanks 100*a*, 100*b*, 100*c*, etc. are stacked such that the first folded over ends 113*a* of the plurality of container blanks 100 are at least partially aligned with each other in a vertical stack. Likewise, the second folded over ends 113*b* of the plurality of container blanks 100 are also at least partially aligned with each other in a vertical stack. As discussed above in connection with FIGS. 6 and 7, the lid blanks are folded over a widthwise fold line such that each of the folded lid blanks 270*a*, 270*b*, etc. has a length less than the length of the casket container 104, and preferably less than the length of the middle portions 115.

The first folded lid blank 270*a* is disposed between a first container blank 100*a* and a second container blank 100*b*, and between a first folded over end 113*a* of the first container blank 100*a* and a second folded over end 113*b* of one of the first container blank 100*a* and the second container blank 100*b*. In this embodiment, the first folded lid blank 270*a* is disposed between the folded ends 113*a* and 113*b* of the first container blank 100*a*.

The second folded lid blank 270*b* is similarly disposed between is disposed between the second container blank 100*b* and a third container blank 100*c*, and between the first folded over end 113*a* of the second container blank 100*b* and the second folded over end 113*b* of one of the second container blank 100*b* and the third container blank 100*c*. In this embodiment, second folded lid blank 270*b* is disposed between the folded ends 113*a* and 113*b* of the second container blank 100*b*.

As shown in FIG. 8, further folded lid blanks 270 may be interleaved between adjacent container blanks 100 in a similar manner. The folded lid blanks 270 thus form spacers supporting the middle portions 115 of adjacent container blanks 100 to reduce or eliminate detrimental sagging.

It will be appreciated that the shipment package 300 shown in FIG. 8 can provide advantages when used with shipment of other designs of corrugated casket containers that ship as blanks with folded over ends, and which ship with foldable corrugated casket lid blanks.

A method for shipping casket assemblies according to one embodiment includes providing a container blank 100 having a bottom panel 106, side panels 110*a*, 110*b* and end panels 108*a*, 108*b*. The bottom panel 106 has opposite side edges and opposite end edges defining a length and width sized to support a deceased human body in the supine position. As shown in FIG. 1, the first and second side panels 110*a*, 110*b* are foldably connected to the opposite side edges of the bottom panel 106 and extend outward from and along the length of the bottom panel 106 in a parallel manner. As also shown in FIG. 1, the first and second end panels 108*a*, 108*b* are foldably connected to the opposite end edges of the bottom panel 106, and extend outward from and along the length of to the bottom panel 106 in a parallel manner.

The method includes folding the first end panel 108*a* such that a first surface of the end panel extends along surface-to-surface (or abuts) the bottom panel 106, thereby creating the first folded over end 113*a*, as shown in FIG. 2 and discussed above. In this embodiment, the second end panel 108*b* is similarly folded to extend surface-to-surface inward along the bottom panel 106, thereby forming the second folded over end 113*b*, as shown in FIG. 2. In this case, the word "abut", when discussing a surface, means to extend surface-to-surface, and not merely edge-to-edge.

The folded over blank 100 shown in FIG. 2 may then be disposed on a shipping support, such as the pallet 202 of FIG. 8. The folded over blank 100 in this case comprises the second folded over blank 100*b* of FIG. 8.

The method also includes providing a lid blank 280 having a top lid panel 252, the top lid panel 252 having at least approximately the length and the width. The lid blank 280 is folded along a widthwise fold line 284 to create a folded lid blank 270, as illustrated via FIGS. 6 and 7.

The method includes disposing the folded lid blank 270, in this case folded lid blank 270*a* on the container blank 100*b* in a first position that is, in a lengthwise direction, between the first folded over end 113*a* and the second end panel 108*b* of the folded over container blank 100*b*. However, the folded over lid blank 270*a* may be at a higher vertical level than the folded over ends 113*a*, 113*b* of the container blank 100*b*.

In this example, the method further includes providing another container blank 100, which in this case in the first container blank 100*a*, having folded over ends 113*a*, 113*b*. The method includes disposing the container blank 100*a* on the shipping support 202 such that a least a portion of the first folded over end 113*a* of the container blank 100*a* abuts the bottom panel 106 of the container blank 100*b*, and such that the bottom panel 106 of the container blank 100*a* abuts the folded lid blank 270*a*. As a result, the folded over lid blank 270*a* is disposed between the container blanks 100*a*, 100*b*, and between the folded over ends 113*a*, 113*b* of the container blank 100*a*.

The method may be repeated to create a stack of several container blanks 100 with interleaved folded lid blanks 270.

It will be appreciated that the above-described embodiments are merely exemplary, and that those of ordinary skill in the art may readily devise their own implementations that incorporate the principles of the invention and fall within the spirit and scope thereof

What is claimed is:

1. A shipment package, comprising:

a plurality of corrugated paper container blanks, each container blank having a first length and configured to be foldable into a casket container sized to receive a deceased adult human in supine position, each container blank having first and second folded over ends, the plurality of container blanks being stacked such that the first folded over ends of the plurality of container blanks are at least partially aligned, and such that the second folded over ends of the plurality of container blanks are at least partially aligned;

a plurality of corrugated paper lid blanks, each lid blank configured to be foldable into a casket lid having at least approximately the first length, and configured to cover an interior of the casket container, each lid blank folded over a widthwise fold line such that the lid blank has a length less than the first length, and wherein a folded first lid blank of the plurality of lid blanks is disposed between a first container blank and a second container blank of the plurality of container blanks, and between a first folded over end of the first container blank and a second folded over end of one of the first container blank and the second container blank.

2. The shipment package of claim 1, wherein a folded second lid blank of the plurality of lid blanks is disposed between the second container blank and a third container blank of the plurality of container blanks, and between a first folded over end of the second container blank and a second folded over end of one of the second container blank and the third container blank.

3. The shipment package of claim 1, wherein the first folded over end of the first container blank of the plurality of container blanks is configured to be folded into a position such that the first folded over end forms a first end panel of the casket container.

4. The shipment package of claim 1, wherein each of the plurality of container blanks comprises a flat sheet, wherein the first folded over end extends along and against a surface of the flat sheet.

5. The shipment package of claim 4, wherein the flat sheet includes a bottom of the casket container and first and second side panels of the casket container.

6. The shipment package of claim 1, wherein each container blank further comprises:

a bottom panel having opposite side edges and opposite end edges;

first and second side panels connected to the opposite side edges of the bottom panel, the first and second side panels extending outward from and substantially parallel to the bottom panel;

first and second end panels foldably connected to the opposite end edges of the bottom panel to form, respectively, the first folded over end and the second folded over end;

at least a first gusset foldably connected to the first side panel along a first fold line and connected to the first end panel along a second fold line, the first gusset having a diagonal fold, the first gusset having a first surface disposed adjacent to and coupled to the first side panel in an additional location away from the first fold line.

7. The shipping package of claim 6, wherein the container blank in an unfolded state has a first thickness, the lid blank in the unfolded state has a second thickness, and first thickness is greater than the second thickness.

8. A method comprising:

a) providing a container blank having a bottom panel having opposite side edges and opposite end edges defining a length and width sized to support a deceased human body in the supine position, first and second side panels foldably connected to the opposite side edges of the bottom panel, the first and second side panels extending outward from and substantially parallel to the bottom panel, first and second end panels foldably connected to the opposite end edges of the bottom panel, the first and second end panels extending outward from and substantially parallel to the bottom panel;

b) folding the first end panel such that a first surface of the end panel abuts the bottom panel, to form a first folded over end;

c) after step b), disposing the blank on a shipping support;

d) providing a lid blank having a top lid panel, the top lid panel having at least approximately the length and the width;

e) folding the lid blank along a widthwise fold line;

f) disposing the folded lid blank on the container blank in a first position that is, in a lengthwise direction, between the first folded over end and the second end panel.

9. The method of claim 8, further comprising folding the second end panel such that a first surface of the end panel abuts the bottom panel, to form a second folded over end, and wherein the first position is, in the lengthwise direction, between the first folded over end and the second folded over end.

10. The method of claim 9, further comprising:

providing a second container blank having a bottom panel having opposite side edges and opposite end edges defining a length and width sized to support a deceased human body in the supine position, first and second side panels foldably connected to the opposite side edges of the bottom panel, the first and second side panels extending outward from and substantially parallel to the bottom panel, first and second end panels foldably connected to the opposite end edges of the bottom panel, the first and second end panels extending outward from and substantially parallel to the bottom panel;

folding the first end panel of the second container blank such that a first surface of the end panel abuts the bottom panel of the second container blank, to form a first folded over end of the second container blank;

disposing the second container blank on the shipping support such that a least a portion of the first folded over end of the second container blank abuts the container blank and such that the bottom panel of the second container blank abuts the folded lid blank.

11. The method of claim 8, further comprising:

providing a second container blank having a bottom panel having opposite side edges and opposite end edges defining a length and width sized to support a deceased human body in the supine position, first and second side panels foldably connected to the opposite side edges of the bottom panel, the first and second side panels extending outward from and substantially parallel to the bottom panel, first and second end panels foldably connected to the opposite end edges of the bottom panel, the first and second end panels extending outward from and substantially parallel to the bottom panel;

folding the first end panel of the second container blank such that a first surface of the end panel abuts the bottom panel of the second container blank, to form a first folded over end of the second container blank;

disposing the second container blank on the shipping support such that a least a portion of the first folded over end of the second container blank abuts the container blank and such that the bottom panel of the second container blank abuts the folded lid blank.

12. The method of claim 8, wherein the container blank further comprises at least a first gusset foldably connected to the first side panel along a first fold line and connected to the first end panel along a second fold line, the first gusset having a diagonal fold, the first gusset having a first surface disposed adjacent to and coupled to the first side panel in an additional location away from the first fold line.

* * * * *